April 28, 1931. B. H. GRAY 1,803,246
AUTOMOBILE SIGNAL SWITCH
Filed Dec. 9, 1927
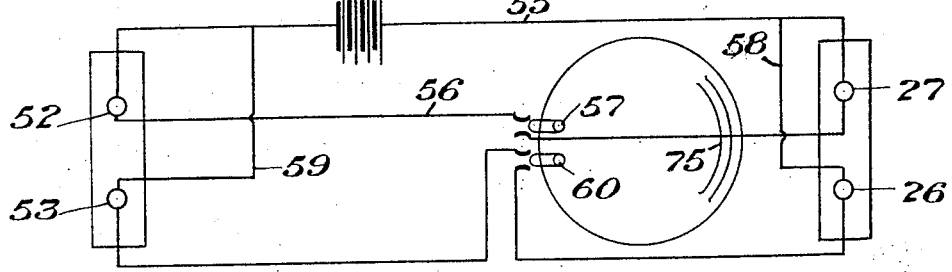
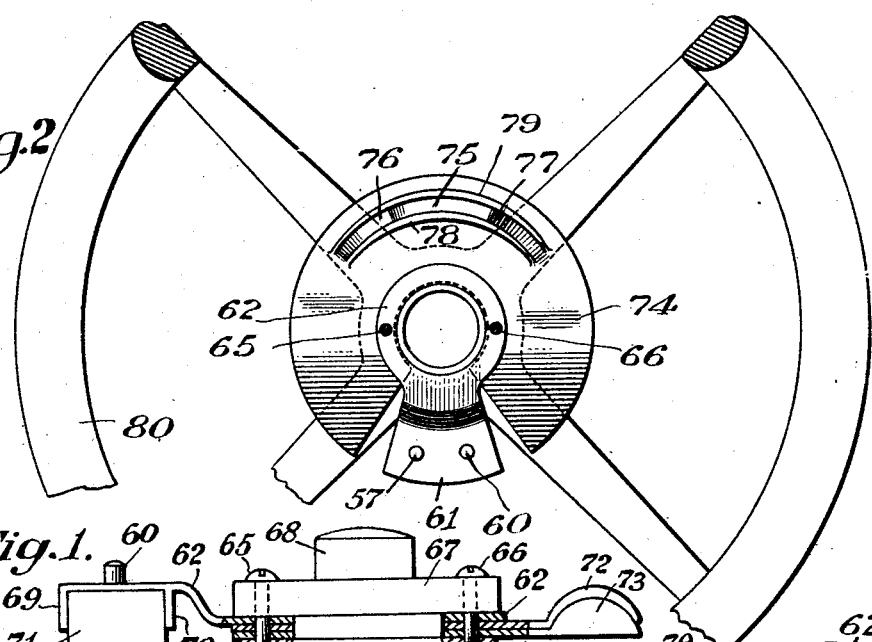
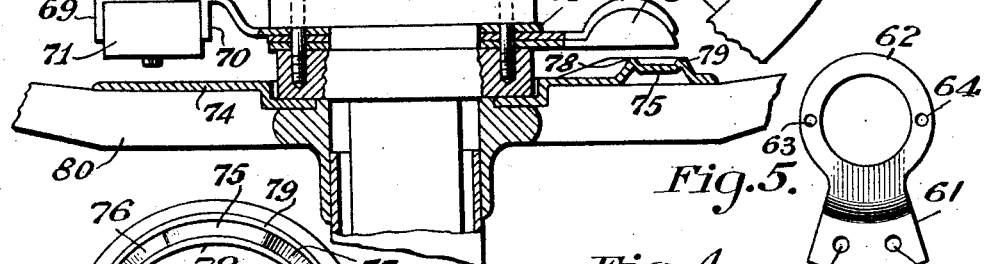
Inventor
B.H. Gray
By Wilkinson & Gusta
Attorneys Patented Apr. 28, 1931

1,803,246

UNITED STATES PATENT OFFICE

BEN H. GRAY, OF SHREVEPORT, LOUISIANA

AUTOMOBILE SIGNAL SWITCH

Application filed December 9, 1927. Serial No. 238,914.

The present invention relates to improvements in automobile signals, and has for an object to provide for announcing proposed turns to the right or left prior to the actual negotiation of the turn, whereby advance knowledge of the moves of vehicles in front and rear may be had and danger of collision proportionately eliminated.

It is an object of the present invention to provide an improved device for the manual actuation of the signals, and for the automatic release of the mechanism upon the making of the turn to the end that the apparatus may be put in the neutral position in readiness for a subsequent manual operation.

It is a further object of the invention to provide a compact operating mechanism for the signal installed upon the steering wheel or steering column in a convenient position for actuation and in which the parts are simply and inexpensively constructed, and so arranged and coordinated as to be applicable to standard constructions.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a fragmentary section taken through the steering column and steering wheel showing the improved control device.

Figure 2 is a plan view of the steering wheel with parts broken away showing the application of the improved mechanism.

Figure 3 is a plan view of the cam plate.

Figure 4 is a section taken through the cam plate.

Figure 5 is a plan view of the switch holding bracket, and

Figure 6 is a diagrammatic view of the circuit arrangement.

The signal lights are preferably grouped in some such circuit arrangement, as shown in Figure 6, in which the battery of the car or some other suitable source of current is indicated at 54. The left hand signal lamps 27 and 52 at the front and rear of the vehicle are coupled with the battery 54 by a circuit 55, 56. This circuit is normally open but adapted to be closed by a push button switch 57 carried fixedly by the steering column.

The right signal lamps 26 and 53 at the front and rear of the vehicle are included with the battery in a circuit 58, 59 and with a normally open push button switch 60 carried fixedly by the steering column adjacent the switch 57 and to the driver's right of the latter.

In Figure 5 is shown a bracket for supporting the two switches 57 and 60, this bracket comprising a radial bracket arm 61 extending out from a ring 62 having openings 63 and 64 to receive the screws or other fastenings 65 and 66 shown in Figure 1. Also in this Figure 1 the ring 62 is shown as secured beneath the cover cap 67 which is a non-rotating part at the top of the steering column for carrying the horn button 68. The radial arm 61 is shown as being upwardly and outwardly curved and as having the downturned spaced flanges 69 and 70 for supporting the casing 71 in which the switch parts are housed. The gas and spark control levers are indicated at 72 and 73.

The steering wheel 80 is shown in Figures 1 and 2 as equipped with a cam plate 74 secured to rotate with the steering wheel and as having a cut out or removed segment shown in Figure 3, which in the normally straight path of the vehicle will come beneath the radial bracket arm 61. The cam plate is further provided with a pressed-up cam portion having a central high point 75 and end portions 76 and 77 which incline downwardly in opposite directions from the high point and merge with the surface of the cam plate 74. The cam plate, particularly at the high point 75 is preferably provided with the edge flanges or ridges 78 and 79 for forming a troughed construction, as shown in Figure 1.

In operation when the driver proposes to make a turn to the left he will in advance push down upon the push button switch 57 thus completing the circuit through the lamps 27 and 52. These lamps will illuminate the panels showing in both front and rear of the vehicle an illuminated arrow to indicate the contemplated change in direction.

If on the other hand the driver desires to turn to the right, before actually attempting to make such turn, he will depress the right push button 60 thereby completing the circuit through the lamps 26 and 53 and illuminating the right hand arrows at both the front and rear of the vehicle. The sudden illumination calls attention to the signal and the arrow points to the direction to be taken.

In Figure 1 the push buttons are shown in the raised position. If the push button 60 is depressed, this push button, which extends through the switch casing 71 will advance closer at its lower end to the cam plate 74, so that when the steering wheel is rotated in the act of negotiating the turn, such lowered end portion of the push button will first encounter one of the inclined surfaces 76 or 77. It will ride up this inclined surface on to the high point on the cam and the high point of the cam is so disposed in elevation from the steering wheel as to shift the push button automatically back to the original position in which it opens the circuit.

It will thus be appreciated that I have provided a semi-automatic arrangement, in which the closing of the two circuit signals is entirely selective and manual, but when the turn is made, automatically the circuits are restored to the open condition and the entire device is in readiness for the next actuation. The automatic feature is important in saving current or the vehicle battery which might otherwise be consumed to great extent if the opening of the circuits was dependent upon human control.

Moreover, if the circuits were allowed to remain closed, the value of the signals would be completely lost.

It is obvious that various changes and modifications may be made in the details of construction and design of the above specifically described embodiment of this invention without departing from the spirit thereof, such changes and modifications being restricted only by the scope of the following claims.

What is claimed is:—

1. Means for mounting and operating a switch of the push button type with the buttons extending above and below the switch on a stationary cap at the top of a steering column over the hub of a steering wheel, comprising a ring adapted to be secured to the stationary cap and having a radial arm to support the switch in a fixed position at one side of the cap, and a cam plate adapted to be secured to the upper side of the steering wheel and having a cam portion in the path of movement of which the lower ends of the switch buttons may project, whereby turning of the steering wheel to a predetermined extent may bring said cam portion against a depressed button of the switch and raise the button.

2. Means for mounting and operating a switch of the push button type with the buttons extending above and below the switch on a stationary cap at the top of a steering column over the hub of a steering wheel, comprising a ring adapted to be secured to the stationary cap and provided with a radial arm to support the switch in a fixed position at one side of the cap, and a cam plate adapted to be secured to the upper side of the steering wheel to turn therewith and having a segmental cutout portion at one side adapted to register beneath the switch when the steering wheel is in normal position for straight line travel, said cam plate having at its opposite side raised cam portions disposed to engage the lower ends of the push button and raise the same upon a predetermined turning of the steering wheel.

BEN H. GRAY.